United States Patent [19]

Jackson

[11] Patent Number: 5,790,616
[45] Date of Patent: Aug. 4, 1998

[54] METHOD AND SYSTEM FOR DETERMINING NUCLEAR REACTOR CORE CONTROL BLADE POSITIONING

[75] Inventor: Roland Otto Jackson, Wilmington, N.C.

[73] Assignee: General Electric Company, Schnectady, N.Y.

[21] Appl. No.: 695,007

[22] Filed: Aug. 9, 1996

[51] Int. Cl.$^6$ .............................. G21C 17/00; G21C 7/06; G21C 7/36
[52] U.S. Cl. .......................... 376/245; 376/236; 376/217
[58] Field of Search ................................ 376/245, 251, 376/258, 259, 236–238, 215–217, 253

[56] References Cited

U.S. PATENT DOCUMENTS

| | | | |
|---|---|---|---|
| 4,717,528 | 1/1988 | Meyer et al. | 376/237 |
| 5,586,157 | 12/1996 | Gross et al. | 376/253 X |

FOREIGN PATENT DOCUMENTS

| | | | |
|---|---|---|---|
| 0 150 096 | 7/1985 | European Pat. Off. | |
| 0 369 865 | 5/1990 | European Pat. Off. | |
| 2 244 235 | 8/1974 | France | |
| 01185483 | 7/1989 | Japan | |
| 1-260400 | 10/1989 | Japan | 376/215 |

OTHER PUBLICATIONS

Motoda, Optim. of Ctrl. Rod Prog and Load. Pattern in Multiregion Nuc. Reac. by Meth. of Approx. Prog., Tech. Note., Nucl. Sci and Eng., vol. 49, pp. 515–524, 1972.

Yokomizo et al., A Man–Machine Comm. Sys. for BWR Core Mgt. Planning, Nuclear Technology, vol. 29, pp. 191–199, May, 1976.

Hayase et al., BWR Ctrl. Rod Prog. Using Heuristic and Math. Methods, Nuclear Technology, vol. 48, pp. 91–100, Apr., 1980.

Zhong et al., Auto. Ctrl. Rod Prog. in BWR Cores, Nuclear Technology, vol. 65, pp. 383–394, Jun. 1984.

Communication from EPO dated Nov. 19, 1997, which includes European Search Report, App. No. EP 97 30 6079, and cited documents (listed above).

Primary Examiner—Charles T. Jordan
Assistant Examiner—Matthew J. Lattig
Attorney, Agent, or Firm—Armstrong, Teasdale, Schlafly & Davis

[57] ABSTRACT

The present invention, in one aspect, is a method for identifying an optimum control blade positioning arrangement. The method generally has an initialization phase and a running, or search, phase. In the initialization phase, an initial control blade positioning arrangement is identified. Once the initial control blade positioning arrangement is identified, such arrangement is then optimized, within the defined constraints, in the running phase. More specifically, in the running phase, each control blade position is analyzed to determine whether the control blade position can be changed from the initial position to either satisfy a constraint or optimize cycle energy, or both.

19 Claims, 2 Drawing Sheets

METHOD AND SYSTEM FOR DETERMINING NUCLEAR REACTOR CORE CONTROL BLADE POSITIONING

FIELD OF THE INVENTION

This invention relates generally to nuclear reactors and more particularly, to identifying optimum control blade positioning in a nuclear reactor core.

BACKGROUND OF THE INVENTION

A nuclear reactor core includes individual fuel assemblies that have different characteristics that affect the strategy for operation of the core. For example, a nuclear reactor core has many, e.g., several hundred, individual fuel bundles that have different characteristics. Such bundles preferably are arranged within the reactor core so that the interaction between the fuel bundles satisfies all regulatory and reactor design constraints, including governmental and customer specified constraints. In addition to satisfying the design constraints, since the core loading arrangement determines the cycle energy, i.e., the amount of energy that the reactor core generates before the core needs to be refreshed with new fuel elements, the core loading arrangement preferably optimizes the core cycle energy.

In order to furnish the required energy output, the reactor core is periodically refueled with fresh fuel assemblies. To optimize core cycle energy, the higher reactivity bundles generally are positioned at an inner core location. To satisfy some design constraints, however, higher reactivity bundles generally are positioned at an outer core location. The most depleted fuel bundles, i.e., the bundles with the least remaining energy content, are removed from the reactor. The interval between refuelings is referred to as a cycle of operation.

During the course of the cycle, the excess reactivity, which defines the energy capability of the core, is controlled in two ways. Specifically, a burnable poison, e.g., gadolinia, is incorporated in the fresh fuel. The quantity of initial burnable poison is determined by design constraints typically set by the utility and by the NRC. The burnable poison controls most, but not all, of the excess reactivity.

Control blades also control the excess reactivity. Specifically, the reactor core contains control rods which assure safe shutdown and provide the primary mechanism for controlling the maximum power peaking factor. The total number of control blades available varies with core size and geometry, and is typically between 50 and 150. The position of the control blades, i.e., fully inserted, fully withdrawn, or somewhere in between, is based on the need to control the excess reactivity and to meet other operational constraints, such as the maximum core power peaking factor. For each control blade, there are twenty five possible positions, for example. Considering symmetry and other requirements that reduce the number of control blades that are available for application at any given time, there are more than six million possible combinations of control blade positions for even the simplest case. Of these possible configurations, only a small fraction satisfy all applicable design constraints, and of these, only a small fraction are economical.

The control blade positioning also influences the cycle energy that any given fuel loading can achieve. In developing a control blade position strategy, it is desirable to maximize the cycle energy in order to minimize the nuclear fuel cycle costs. The control blade positioning problem therefore may be represented as an optimization with constraints problem. Until now, there has been no direct solution methodology or system to determine the optimum control blade positioning for a particular situation.

Traditionally, control blade positioning determinations are made on a trial and error basis, primarily based on the past experience of the engineers. The impact of the identified control blade positioning on the reactor performance is then determined by computer simulation. If a particular design constraint is not satisfied by the identified arrangement, then the arrangement is modified and another computer simulation is run. Man-weeks of resources may typically be required before appropriate control blade positions are identified using the above described procedure.

In addition, once control blade positions that satisfy all design constraints have been identified using the trial and error approach, such identified positions may not provide the actual maximum cycle energy. Therefore, the trial and error process continues until the engineers believe that the optimum positions have been identified. In practice, however, it is possible that particular control blade positions that are not necessarily consistent with the engineers' past experience may be the actual optimum positions. Such actual optimum control blade positions may not necessarily be identified through the trial and error process.

Since the control blade positioning problem generally is considered unique for each reactor, no known algorithm provides a viable solution for identifying optimum control blade positions for all reactors. In addition, expert systems have not been used on a broad basis since a standard set of rules typically are not applicable over a wide range of situations characteristic of the many unique and complex control blade positioning arrangements which differ in all reactors.

It would be desirable, of course, to reduce the time required to identify control blade positions which optimize cycle energy and satisfy all design constraints. It also would be desirable to provide a methodology applicable to a wide range of reactors for consistently and reliably identifying optimum control blade positions.

SUMMARY OF THE INVENTION

These and other objectives may be attained by the present invention which, in one aspect, is a method for identifying optimum control blade positions. The method generally has two (2) phases. The first phase is an initialization phase and the second phase is a running, or search, phase. In the initialization phase, initial control blade positions are identified. Once the initial control blade positions are identified, the positioning is then optimized in the running phase.

More specifically, in the initialization phase, an estimate is made of the average density of control blades in the core that will lead to a critical state. A weighting function is applied based on the relative importance of each control blade position. Other boundary conditions, such as required operating margins, are also input. These boundary conditions appear as constraints with allowable upper and lower values. Next, rules are established for each location that specifies the direction to take to maximize the cycle energy and/or satisfy a constraint. Using the boundary conditions, initial control blade positions are determined.

In the running phase, the overall fitness of the population of possible control rod pattern positionings is improved. Such improvement is achieved by removing less fit members from the set and replacing the removed members with more fit members. Each member of the population is a single possible position for each of the control blades available for use in the reactor core model. As an example, there may be 50 members of the population, i.e., 50 possible control blade positionings, and the population fitness is determined by running the reactor simulation.

To improve, or optimize, the population fitness, new members are created through inheriting the best characteristics of the current population. This approach is very effective for searching the vast space of possible rod positionings in an efficient manner. As the fitness of the population improves, however, this optimization approach becomes less efficient.

Therefore, once the population fitness achieves a predetermined level, a one-dimensional (1-D) search mode is used in an attempt to identify an even more optimum population. In the 1-D search mode, each control blade position is analyzed to determine whether the blade position can be changed from an initial position to either satisfy a constraint or optimize cycle energy, or both.

Subsequent to analyzing each blade position as described above, random control blade positions are created and compared with the then identified best case. Such randomly generated control blade positions are sometimes are referred to as "random jumps", and such "random jumps" are made to potentially identify previously unconsidered control blade positions that may be more optimum than the most optimum positions identified up to that point in processing.

In another aspect, the present invention is a system including a computer programmed to execute the above described initialization and running phase routines. By programming a computer to perform such routines, the amount of engineer time required to identify control blade positions which optimize cycle energy and satisfies all design constraints can be reduced. In addition, such a method and system are believed to be applicable to a wide range of reactors for consistently and reliably identifying optimum control blade positions.

DETAILED DESCRIPTION OF THE DRAWINGS

In one aspect, the present invention is a method for identifying optimum control blade positioning. The method can be generally understood as having two (2) phases. The first phase is an initialization phase and the second phase is the running, or search, phase. Generally, in the initialization phase, initial control blade positions are identified, and in the running phase, the control blade positions are optimized within the design constraints.

In another aspect, the present invention is a system including a computer programmed to execute the method described in detail below. The method can be practiced, for example, on most any type of computer including even a personal computer. The type of computer selected depends primarily on the speed at which the operator desires to have the optimum control blade positions identified and the amount of memory required for any particular operation. Such speed and memory requirements may, of course, vary depending upon the number of reactors being analyzed and the number of control blades in the reactor cores. The method is not limited to practice on any one particular type of computer.

Figure 1:
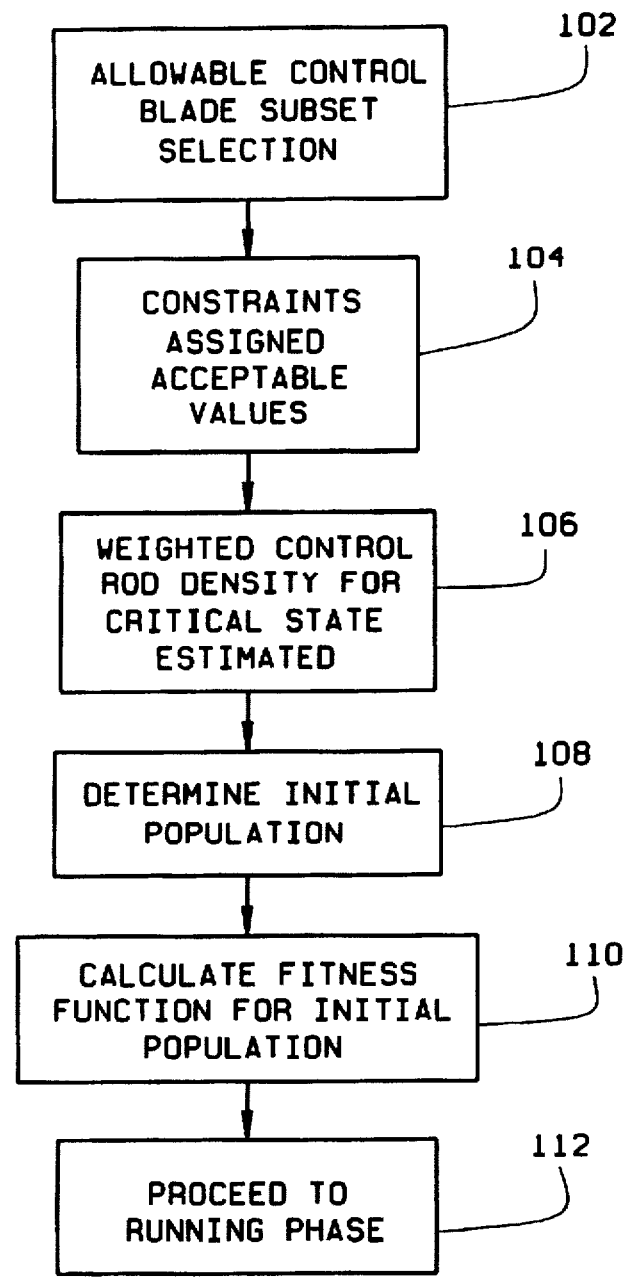
FIG. 1 is a flow chart illustrating a sequence of process steps executed in the initialization phase for identifying optimum control blade positions in accordance with one embodiment of the present invention.

Referring now specifically to FIG. 1, a sequence of process steps 100 executed in the initialization phase for identifying initial control blade positions is illustrated. Particularly, a set of control blades to be positioned within the reactor core is selected 102 for analysis. The set of blades identified may, for example, be selected so that the set is symmetric about the core.

The design constraints are then identified and acceptable values or ranges are assigned to each constraint 104. As an example, the reactor peak local thermal power margin design constraint may be 10 percent (10%). Reactor peak local power margin depends, at least in part, on the control blade positions and locations. Therefore, the peak local power margin design constraint can be affected based on the control blade position. As a part of step 104, rules also are established for each blade, and such rules specify a direction (e.g., up or down) in which to move a control blade to maximize the cycle energy and/or satisfy a constraint. These rules typically are generic for each reactor and are based primarily upon the experience of the engineer. In defining the rules, each blade is evaluated separately in determining direction.

The direction rules must be established for each particular loading of each reactor. Of course, once the direction rules are created for a particular reactor, such rules may remain relatively constant over a long period of time, e.g., for many cycles. However, it may be recommended to at least reevaluate such rules for each cycle.

After determining the constraints and rules, a criticality weight value 106 is assigned to each blade. A control blade that has more of an affect on criticality than another blade is assigned a greater weight than the other blade. For example, a control blade located in the core center has more of a direct impact on criticality than a control blade at the core periphery. Therefore, the control blade at the core center is assigned a higher weight than the control blade at the core periphery, in general. Each control blade is assigned such a weight based on its impact on criticality.

An initial population 108 is then determined. Specifically, a random control blade pattern is identified. The random population randomly assigns a position to each control blade. The initial random population can be developed on a purely random basis.

A fitness function 110 is then determined for each unique control blade positioning member in the random population. The fitness function is a representation of how well each member of the random population satisfies all the constraints. For example, a high value fitness function indicates that a member of the population satisfies the constraints whereas a low value fitness function indicates that the member does not satisfy the constraints. Once the fitness function has been determined for each member of the initial population, the initialization phase is complete and processing proceeds 112 to the running phase.

Figure 2:
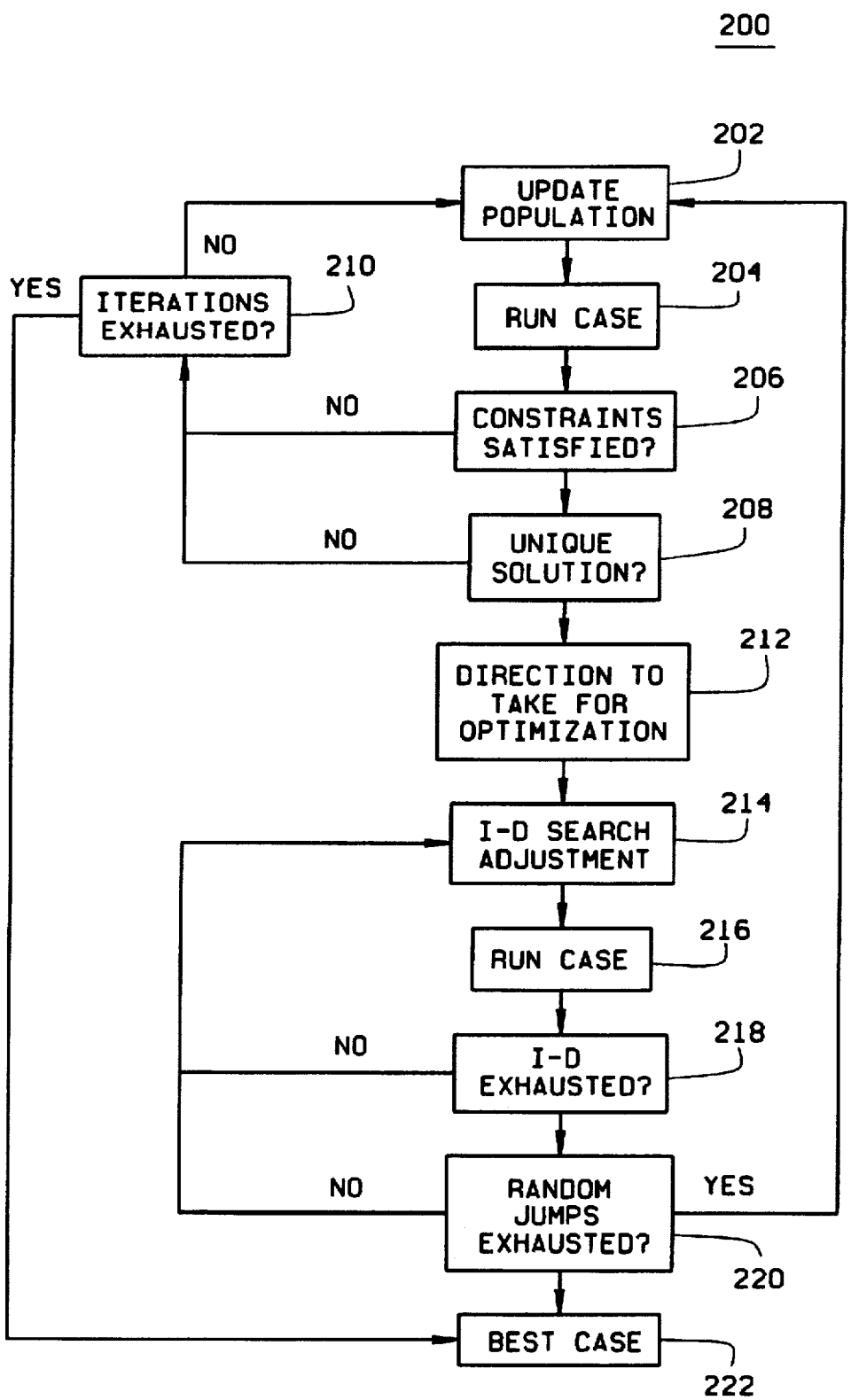
FIG. 2 is a flow chart illustrating a sequence of process steps executed in the running phase for identifying optimum control blade positions in accordance with one embodiment of the present invention.

FIG. 2 is a flow chart illustrating a sequence of process steps 200 executed in the running, or search, phase for identifying optimum control blade positions. Process steps 200 are executed subsequent to completion of initialization process steps 100 illustrated in FIG. 1. Referring to FIG. 2, and for the first iteration, the population (i.e., the control blade positions) is updated 202 to contain the initial population identified in the initialization phase.

The core is then run, i.e., simulated, 204 for each control blade positioning which is a member of the initial population. Each constraint is then checked 206 to determine whether the constraints are satisfied by the case just run. If all constraints are satisfied, then the blade positioning is compared to previously determined blade positions to determine whether the blade positioning is unique, or different, from any previously run case 208.

If the constraints are not satisfied 206, or if the blade position is not unique 208, then processing proceeds to determine whether all blade position iterations 210 have been analyzed. If all iterations have not been analyzed, then the second part of the search phase is started. In this second part, the rule base created in the initialization phase is searched to determine the direction to adjust the control blades in order to satisfy the unsatisfied constraints or to be unique. For example, if at the particular blade location, a design constraint is not satisfied, then the position of the blade at the subject core location typically must be changed. The rule base, as explained above, may contain a rule that indicates whether the blade should be moved up or down, depending upon the specific conditions created by the particular blade positions. If no rules are available for a particular condition, e.g., an unsatisfied constraint, then the direction that the control blade is moved is randomly selected. In any event, and in accordance with the foregoing, the control blade position is changed and the population is then updated 202 and processing proceeds through steps 204, 206 and 208 as described above.

If the constraints are satisfied and if the solution is unique, the rule base is searched to determine the direction the blade should be changed in order to maximize cycle energy 212. This means that based on the specific conditions created by the particular blade positions, a rule in the rule base may indicate the direction in which the particular blade should be changed in order to improve cycle energy. Therefore, the rule from the rule base will indicate whether the particular control blade should be moved up or down in order to improve cycle energy.

The particular control blade is then adjusted, which is sometimes referred to herein as a 1-D (one-dimensional search) adjustment 214. Once the new blade position adjustment has been made, the new case is run 216. If every blade position has not been evaluated 218, then another blade is either randomly or sequentially selected for analysis and processing returns to step 214 to perform the above described analysis in connection with steps 214, 216 and 218.

The purpose for the above described searching, or evaluation, is to identify a most optimum core loading arrangement. Such searching can be performing in either a "depth" or "breadth" mode of operation. In the depth mode, once a change has been made that results in an improved core loading arrangement, then the subsequent change is made to such alternative arrangement. That is, processing continues by using the improved position as the "base" position and processing does not return to the initial, less optimum, control blade position. Once all the blade positions have been changed, the blade position arrangement under analysis is then selected as the best arrangement for further processing as described below.

In the breadth mode, each alternative control blade position arrangement is analyzed with respect to the initial control blade position arrangement. This means that after evaluation of a new arrangement, and even if the new arrangement is an improvement over the initial arrangement, the next arrangement considered is a variation of the initial arrangement. That is, processing returns to the initial arrangement and selects another control blade position to change. Once all the control blade positions have been changed, then the best alternative arrangement is selected for further processing as described below.

Once all the blades have been perturbed and no further improvements are found, then local random initial positioning arrangements 220 are generated and processing returns to step 214. The local random positions selected are close to the base positionings unlike random positions which may be selected in connection with step 202 in which random positioning can be very different from any positioning previously considered, i.e., a "global" search. The most optimum control blade positioning arrangement identified up to this point in processing is selected for comparison to the random initial arrangements. Such "random jumps" are made to potentially identify previously unconsidered arrangements that may be more optimum than the most optimum arrangement identified up to that point in processing. For example, a particular randomly selected blade position may have its position changed. With such a change in the control blade position at that core location, the other control blade positions are changed in the core so that the reactivity level matches the reactivity level of its assigned core location. Once the blades are so arranged, processing proceeds to step 216 to determine whether the randomly selected arrangement is more optimum than the best known arrangement.

The number of random jumps executed may be selected by the operator based on the amount of time available for identifying the most optimum arrangement. The number of random jumps may vary, for example, from as few as five (5) to as many as twenty (20). If the number of random jumps selected have been executed, then processing returns to step 202. The population is updated to the most recently identified case, i.e., the then best known case, which is then run 204. If the constraints are satisfied 206 and if the case is not unique 208, and all iterations are exhausted 210, then the best case is identified to be the present case 222. As should be understood from the foregoing, as the process progresses the initial population is continually replaced with a better population with a better population where the least fit members have been removed and replaced with more fit members such that the overall fitness of the population improves.

The above described method for identifying the optimum control blade positioning arrangement reduces the amount of engineer time required to identify a control blade positioning arrangement which optimize cycle energy and satisfies all design constraints. Importantly, such method is believed to be applicable to a wide range of reactors for consistently and reliably identifying optimum control blade positioning arrangements.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for identifying control blade positions in a reactor core, the control blade positions being required to satisfy predetermined design constraints, said method comprising the steps of:

determining an initial population of control blade position members, wherein determining an initial population of control blade position members comprises the steps of
selecting a control blade subset, assigning weights to
each selected control blade, assigning values to each predetermined constraint, creating rules for each selected control blade to specify a direction in which to move each blade to maximize the cycle energy or satisfy a predetermined constraint, or both, initially simulating reactor operation wherein each control blade is located at a random location, and determining initial values for cycle energy and design constraints for the initial control blade location arrangement;

optimizing the initial population to improve energy efficiency of the population and to satisfy the design constraints, said population optimizing comprising the steps of:
  (i) creating a new population including at least one new member;
  (ii) determining a fitness function for the new population;
  (iii) repeating steps (i) and (ii) until a population is identified that has a predetermined fitness level;
  (iv) creating new populations by performing a 1-D search adjustment starting with the identified population having the predetermined fitness level.

2. A method in accordance with claim 1 wherein each control blade is assigned a weight based on an affect of the blade on criticality.

3. A method in accordance with claim 1 wherein the step of (i) creating a new population including at least one new member comprises the steps of:
  determining whether a current control blade positioning arrangement satisfies the design constraints; and
  if at least one design constraint is not satisfied, then searching the rules to determine a direction in which to move a selected control blade in order to satisfy the constraint.

4. A method in accordance with claim 1 wherein the step of (i) creating a new population including at least one new member further comprises the step of:
  searching the rules to determine a direction in which to move a selected control blade if all the design constraints are satisfied and if the current control blade positioning arrangement is not unique.

5. A method in accordance with claim 1 wherein the step of (i) creating a new population including at least one new member further comprises the step of:
  searching the rules to determine a direction in which to move a selected control blade to improve cycle energy if all the design constraints have been satisfied and if the current control blade positioning arrangement is unique.

6. A method in accordance with claim 5 further comprising the step of randomly selecting a control blade position arrangement change.

7. A method in accordance with claim 1 wherein the step of (i) creating a new population including at least one new member further comprises the step of:
  (a) selecting a control blade;
  (b) determining whether an initial control blade position in the initial population satisfies the design constraints;
  (c) if at least one design constraint is not satisfied, then searching the rules to determine a direction in which to move the control blade to satisfy the constraint;
  (d) if all the design constraints are satisfied, then searching the rules to determine a direction in which to move the control blade in order to improve cycle energy;
  (e) if there is no rule for moving the control blade, then randomly selecting a direction in which to move the control blade; and
  (f) determining new constraint values and cycle energy which result from moving the control blade.

8. A method in accordance with claim 7 wherein each control blade is selected and steps (ii)–(vi) are performed for each such selected control blade.

9. A method in accordance with claim 1 wherein the step of (iv) creating new populations by performing a 1-D search adjustment is performed in a depth mode of operation, the depth mode providing that once a change has been made that results in an improved core loading arrangement, then any subsequent change is made to such alternative arrangement in performing steps (ii)–(iv).

10. A method in accordance with claim 8 wherein the step of (iv) creating new populations by performing a 1-D search adjustment is performed in a breadth mode of operation, the breadth mode providing that each alternative core loading arrangement is analyzed with respect to the initial control blade positioning arrangement in performing steps (ii)–(iv).

11. A method in accordance with claim 1 further comprising the step of:
  (v) generating random control blade positioning arrangements.

12. A method in accordance with claim 11 further comprising the step of selecting a control blade positioning arrangement which satisfies all design constraints and has the highest cycle energy as a best case control blade positioning arrangement.

13. A system for identifying a control blade positioning arrangement for a reactor core, the control blade positioning arrangement being required to satisfy predetermined design constraints, said system comprising a computer having a memory storage, said memory storage having stored therein a weight assigned to each blade based on the affect such blade has on criticality, values assigned to each predetermined design constraint, and rules for control blade positions which specify a direction in which to move a control blade to maximize the cycle energy or satisfy a predetermined constraint, or both, said computer programmed to:
  determine an initial population of control blade position members;
  optimize the initial population to improve energy efficiency of the population and to satisfy the design constraints, said population optimizing performed by:
    (i) creating a new population including at least one new member;
    (ii) determining a fitness function for the new population;
    (iii) repeating steps (i) and (ii) until a population is identified that has a predetermined fitness level;
    (iv) creating new populations by performing a 1-D search adjustment starting with the identified population having the predetermined fitness level.

14. A system in accordance with claim 13 wherein to determine an initial population of control blade position members, said computer is further programmed to:
  select a control blade subset;
  assign weights to each selected control blade;
  assign values to each predetermined constraint;
  create rules for each selected control blade to specify a direction in which to move each blade to maximize the cycle energy or satisfy a predetermined constraint, or both;
  initially simulate reactor operation wherein each control blade is located at a random location; and determine initial values for cycle energy and design constraints for the initial control blade location arrangement.

15. A system in accordance with claim 14 wherein to create a new population including at least one new member, said computer is further programmed to:

determine whether the current control blade positioning arrangement satisfies the design constraints; and if at least one design constraint is not satisfied, then search the rules to determine a direction in which to move a selected control blade in order to satisfy the constraint.

16. A system in accordance with claim 14 wherein to create a new population including at least one new member, said computer is further programmed to:

search the rules to determine a direction in which to move a selected control blade if all the design constraints are satisfied and if the control blade positioning arrangement is not unique.

17. A system in accordance with claim 14 wherein to create a new population including at least one new member, said computer is further programmed to:

search the rules to determine a direction in which to move a selected control blade to improve cycle energy if all the design constraints have been satisfied and if the control blade positioning is unique.

18. A system in accordance with claim 13 wherein to create new populations by performing a 1-D search adjustment, said computer is programmed to operate in a depth mode, the depth mode providing that once a change has been made that results in an improved core loading arrangement, then any subsequent change is made to such alternative arrangement in performing steps (ii)–(iv).

19. A system in accordance with claim 13 wherein to create new populations by performing a 1-D search adjustment, said computer is programmed to operate in a breadth mode, the breadth mode providing that each alternative core loading arrangement is analyzed with respect to the initial control blade positioning arrangement in performing steps (ii)–(iv).

* * * * *